(12) United States Patent
Tsukada

(10) Patent No.: US 10,132,258 B2
(45) Date of Patent: Nov. 20, 2018

(54) INTAKE VALVE CONTROL DEVICE FOR INTERNAL COMBUSTION ENGINE

(71) Applicant: TOYOTA JIDOSHA KABUSHIKI KAISHA, Toyota-shi, Aichi-ken (JP)

(72) Inventor: Yuta Tsukada, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 24 days.

(21) Appl. No.: 15/308,682

(22) PCT Filed: May 7, 2015

(86) PCT No.: PCT/IB2015/000800
§ 371 (c)(1),
(2) Date: Nov. 3, 2016

(87) PCT Pub. No.: WO2015/170168
PCT Pub. Date: Nov. 12, 2015

(65) Prior Publication Data
US 2017/0184040 A1    Jun. 29, 2017

(30) Foreign Application Priority Data

May 9, 2014   (JP) ................................. 2014-097570

(51) Int. Cl.
*F02D 41/06*    (2006.01)
*F02D 11/10*    (2006.01)
(Continued)

(52) U.S. Cl.
CPC .............. *F02D 41/06* (2013.01); *F02D 11/10* (2013.01); *F02D 41/00* (2013.01);
(Continued)

(58) Field of Classification Search
CPC . F02D 41/06–41/068; F02D 9/00–9/02; F02D 2009/0201; F02D 2009/022; F02D 2009/0249; F02D 2009/025
(Continued)

(56) References Cited

U.S. PATENT DOCUMENTS 8,234,054 B2 *   7/2012 Nakasaka .......... F02D 13/0238
123/179.18
2013/0297182 A1 *  11/2013 Vincenzi .............. F02D 41/062
701/103

FOREIGN PATENT DOCUMENTS

EP         2647559 A2 * 10/2013 ........... F02D 41/062
EP         2647816 A2 * 10/2013 ........... F02D 41/064
(Continued)

*Primary Examiner* — Erick Solis
*Assistant Examiner* — Robert Werner
(74) *Attorney, Agent, or Firm* — Hunton Andrews Kurth LLP

(57) ABSTRACT

A control device for an internal combustion engine is provided. The internal combustion engine includes a plurality of cylinders. The internal combustion engine is configured such that when an intake valve of one cylinder on a compression stroke among the plurality of cylinders is open, an intake valve of each of the remainder of the plurality of cylinders is closed. The control device includes an electronic control unit configured to: (i) determine an open-closed state of the intake valve of each of the plurality of cylinders; and (ii) adjust an opening degree of a throttle valve to a first opening degree that is larger than a second opening degree corresponding to an idling operation, when the electronic control unit determines that the intake valve of any one of the plurality of cylinders is open at the time of startup of the internal combustion engine, to reduce compression torque and vibrations.

3 Claims, 7 Drawing Sheets

(51) Int. Cl.
  *F02D 41/00* (2006.01)
  *F02N 19/00* (2010.01)
(52) U.S. Cl.
  CPC ....... *F02D 41/0002* (2013.01); *F02D 41/062* (2013.01); *F02N 19/004* (2013.01); *F02D 2041/001* (2013.01); *F02D 2041/002* (2013.01); *Y02T 10/18* (2013.01); *Y02T 10/42* (2013.01)
(58) Field of Classification Search
  USPC .................................................. 701/103, 113
  See application file for complete search history.

(56) References Cited

FOREIGN PATENT DOCUMENTS

| | | |
|---|---|---|
| JP | 2004-143939 A | 5/2004 |
| JP | 2004-308570 A | 11/2004 |
| JP | 2012-092656 A | 5/2012 |

\* cited by examiner

INTAKE VALVE CONTROL DEVICE FOR INTERNAL COMBUSTION ENGINE

CROSS-REFERENCE TO RELATED APPLICATIONS

This is a national phase application based on the PCT International Patent Application No. PCT/IB2015/000800 filed May 7, 2015, claiming priority to Japanese Patent Application No. 2014-097570 filed May 9, 2014, the entire contents of both of which are incorporated herein by reference.

BACKGROUND OF THE INVENTION

1. Field of the Invention

The invention relates to a technical field pertaining to a control device for an internal combustion engine mounted in a vehicle such as an automobile, the control device configured to control the operation of the internal combustion engine.

2. Description of Related Art

In order to reduce vibrations during starting of an internal combustion engine mounted in a vehicle, reduction of the compression torque (i.e., the torque that is generated as the air in a combustion chamber is compressed) has been promoted. For example, Japanese Patent Application Publication No. 2012-092656 (JP 2012-092656 A) describes a technology in which the rotational angle of a crankshaft is controlled when an internal combustion engine is stopped, whereby the compression torque during starting of the internal combustion engine is made equal to or less than a prescribed value. Japanese Patent Application Publication No. 2004-143939 (JP 2004-143939 A) describes a technology in which a throttle valve is closed when an internal combustion engine is stopped, whereby the amount of intake air is prevented from being excessive. Japanese Patent Application Publication No. 2004-308570 (JP 2004-308570) describes a technology in which, during starting of an internal combustion engine, a throttle valve is fully closed and a crankshaft of the internal combustion engine is rotated by an electric motor, whereby negative pressure is generated in an intake manifold.

SUMMARY OF THE INVENTION

Some internal combustion engines having a plurality of cylinders are controlled such that, when an intake valve of a prescribed cylinder is open on the compression stroke, an intake valve of each of the cylinders other than the prescribed cylinder is closed. In such an internal combustion engine, when control of closing a throttle valve is executed as described in JP 2004-143939 A or JP 2004-308570 A, air is supplied to an intake manifold from a prescribed cylinder on the compression stroke, so that the pressure in the intake manifold increases. Thus, in a cylinder which undergoes the intake stroke next, the amount of intake air is increased due to an increase in the pressure in the intake manifold. This increases the compression torque. As a result, relatively strong vibrations are caused due to the compression torque.

The invention provides a control device for an internal combustion engine, which makes it possible to reduce the occurrence of vibrations due to the compression torque during starting of the internal combustion engine.

A control device for an internal combustion engine according to an aspect of the invention is a control device for an internal combustion engine configured such that when an intake valve of one cylinder on a compression stroke among a plurality of cylinders is open, an intake valve of each of the remainder of the plurality of cylinders is closed. The control device includes open-close determining means configured to determine an open-closed state of the intake valve of each of the plurality of cylinders, and opening degree control means for adjusting an opening degree of a throttle valve to a first opening degree that is larger than a second opening degree corresponding to an idling operation, when the open-close determining means determines that the intake valve of any one of the plurality of cylinders is open at the time of startup of the internal combustion engine.

That is, an aspect of the invention relates to a control device for an internal combustion engine, the internal combustion engine including a plurality of cylinders, and the internal combustion engine being configured such that when an intake valve of one cylinder on a compression stroke among the plurality of cylinders is open, an intake valve of each of the remainder of the plurality of cylinders is closed. The control device includes an electronic control unit configured to: (i) determine an open-closed state of the intake valve of each of the plurality of cylinders; and (ii) adjust an opening degree of a throttle valve to a first opening degree that is larger than a second opening degree corresponding to an idling operation, when the electronic control unit determines that the intake valve of any one of the plurality of cylinders is open at time of startup of the internal combustion engine.

The control device for an internal combustion engine according to the invention controls, for example, an internal combustion engine configured as a power source that is able to supply power to a drive shaft of a vehicle. The internal combustion engine in the invention includes a plurality of cylinders. When the intake valve of one cylinder on the compression stroke among the plurality of cylinders is open, the intake valve of each of the remainder of the plurality of cylinders is closed. That is, in the internal combustion engine according to the invention, the situation where the cylinder of which the intake valve is open on the compression stroke and the cylinder of which the intake valve is open on the intake stroke exist at the same time does not take place. As long as such a condition is satisfied, any kinds of internal combustion engines may be employed as the internal combustion engine according to the invention regardless of the kind of fuel, the fuel supply mode, the fuel combustion mode, the configuration of an air intake and exhaust system, the arrangement of cylinders, and the like.

When the control device for an internal combustion engine according to the invention operates, first, the open-close determining means determines the open-close state of the intake valve of each of the plurality of cylinders at the time of startup of the internal combustion engine. Although open-close determining means that is able to determine whether the intake valve is open or closed is sufficient as the open-close determining means according to the invention, the open-close determining means may be configured to determine, for example, an opening degree of the intake valve. It is possible to detect an open-closed state of the intake valve based on, for example, a crank angle of the internal combustion engine.

When the open-close determining means determines that an intake valve of any one of the cylinders is open, the opening degree control means controls an opening degree of the throttle valve. Specifically, the open-close determining means increases the opening degree of the throttle valve to the first opening degree that is larger than the second opening degree corresponding to idling operation (hereinafter, the second opening degree will be referred to as "ISC opening degree" as appropriate). It is preferable that the control for adjusting the opening degree of the throttle valve to the first opening degree be executed as soon as possible after a command to start the internal combustion engine is issued. However, if the throttle valve opening degree is adjusted to the first opening degree by the time when the intake valve, which has been determined to be open, is closed, the effects of the invention, described later, are appropriately achieved.

By adjusting the throttle valve opening degree to the first opening degree when the intake valve of any one of the cylinders is open, an increase in the pressure in an intake manifold due to flowback of the air from the cylinder of which the intake valve is open (i.e., the air that is returned into the intake manifold from the cylinder due to compression) is inhibited. As a result, it is possible to avoid the situation where, when the intake valve of the cylinder that undergoes the intake stroke next is opened, the air in an amount larger than that of the air that should flow in the cylinder flows in the cylinder and the compression torque increases. Thus, it is possible to reduce the occurrence of vibrations due to the compression torque (such as the vibrations of the body of the internal combustion engine, and the vibrations of a drive system).

The "first opening degree" according to the invention is set to such an opening degree that an increase in the pressure in the intake manifold due to flowback of the air is inhibited as described above (specifically, such an opening degree that generation of a positive pressure in the intake manifold is prevented). If only inhibition of an increase in the pressure in the intake manifold is taken into account, it is preferable to set the first opening degree to an opening degree that is as large as possible (e.g. the fully-opened opening degree). However, if the first opening degree is set larger than necessary, inconvenience may occur in the subsequent intake stroke. Thus, it is preferable that the first opening degree be set to such a value that the inconvenience does not occur, through simulation executed in advance.

When the first opening degree is larger than the ISC opening degree, the vibrations due to the compression torque are reduced as compared with the case where the throttle valve opening degree is kept at the ISC opening degree. That is, as long as the condition that the first opening degree is larger than the ISC opening degree is satisfied, the effects of the invention are appropriately achieved.

As described above, with the control device for an internal combustion engine according to the invention, it is possible to appropriately reduce the occurrence of vibrations at the time of startup of the internal combustion engine.

In the control device for an internal combustion engine according to the above aspect of the invention, the opening degree control means may adjust the opening degree of the throttle valve from the first opening degree to the second opening degree, when the open-close determining means determines that the intake valve of the cylinder, the intake valve having been determined to be open, is closed.

With this configuration, when the open-close determining means determines that the intake valve of the cylinder, the intake valve having been determined to be open, is closed, the opening degree of the throttle valve is adjusted from the first opening degree to the second opening degree (the ISC opening degree). Thus, it is possible to rapidly generate a negative pressure in the intake manifold after the intake valve is closed. As a result, it is possible to effectively reduce the occurrence of vibrations.

In the control device for an internal combustion engine according to the above aspect of the invention, the control device may include opening degree adjusting means for setting the first opening degree to a smaller value as a crank angle at the time of startup of the internal combustion engine is closer to a crank angle at a top dead center in a direction from a bottom dead center to the top dead center.

With this configuration, at the time of startup of the internal combustion engine, first, a crank angle of the internal combustion engine (i.e., a stop angle of a crankshaft) is detected. The opening degree adjusting means then adjusts the first opening degree of the throttle valve based on the detected crank angle. Specifically, the opening degree adjusting means sets the first opening degree to a smaller value as the crank angle at the time of startup of the internal combustion engine is closer to the crank angle at the top dead center in the direction from the bottom dead center to the top dead center.

If the first opening degree is not adjusted based on the crank angle and the first opening degree is always set to a large value, there is a possibility that the opening degree of the throttle valve will not become the ISC opening degree by the time when the piston passes the next top dead center even if the throttle valve is controlled such that the opening degree of the throttle valve is brought to the ISC opening degree after the intake valve is closed. That is, there is a possibility that the opening degree of the throttle valve will fail to completely return to the opening degree before the control due to a time lug between the issuance of a command and the actual completion of the operation. In such a case, the amount of air taken into the cylinder that undergoes the intake stroke next increases. This increases the compression torque, resulting in stronger vibrations.

With the above configuration, as described above, as the crank angle is closer to the crank angle at the top dead center, the first opening degree is set to a smaller value. Thus, as the crank angle is closer to the crank angle at the top dead center, the amount by which the throttle valve is controlled is smaller. As a result, it is possible to avoid the situation where the vibrations due to the compression torque are increased due to the adjustment of the opening degree of the throttle valve to the first opening degree. The adjustment of the first opening degree should be made using, for example, a map, which is prepared on the condition that an increase in the pressure in the intake manifold is inhibited and the opening degree of the throttle valve is appropriately adjusted to the ISC opening degree.

In the control device for an internal combustion engine according to the above aspect of the invention, the opening degree control means may adjust the opening degree of the throttle valve to the first opening degree, when a pressure in the intake manifold at the time of startup of the internal combustion engine is equal to or higher than an atmospheric pressure.

With this configuration, it is determined whether the pressure in the intake manifold is equal to or higher than the atmospheric pressure before the throttle valve opening degree is adjusted. When it is determined that the pressure in the intake manifold is equal to or higher than the atmospheric pressure, the control for adjusting the throttle valve opening degree to the first opening degree is executed. In other words, when the pressure in the intake manifold is lower than the atmospheric pressure, the throttle valve opening degree is not adjusted to the first opening degree.

With the control described above, it is possible to avoid the situation where the compression torque is increased by adjusting the throttle valve opening degree to the first opening degree. For example, there is a possibility that the pressure in the intake manifold will not return to the atmospheric pressure (i.e., lower than the atmospheric pressure) immediately after stop control of the internal combustion engine is completed. In this state, if the throttle valve opening degree is adjusted to the first opening degree (i.e., adjusted to an opening degree larger than the ISC opening degree), the pressure in the intake manifold increases, so that the compression torque increases. Thus, when the pressure in the intake manifold is lower than the atmospheric pressure, the throttle valve opening degree is not adjusted to the first opening degree (i.e., the control by the opening degree control means is temporarily prohibited), so that it is possible to more appropriately reduce the occurrence of vibrations.

The operation and effects of the invention will be explained in the following detailed description of embodiments.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, an embodiment of the invention will be described with reference to the accompanying drawings.

Figure 1:
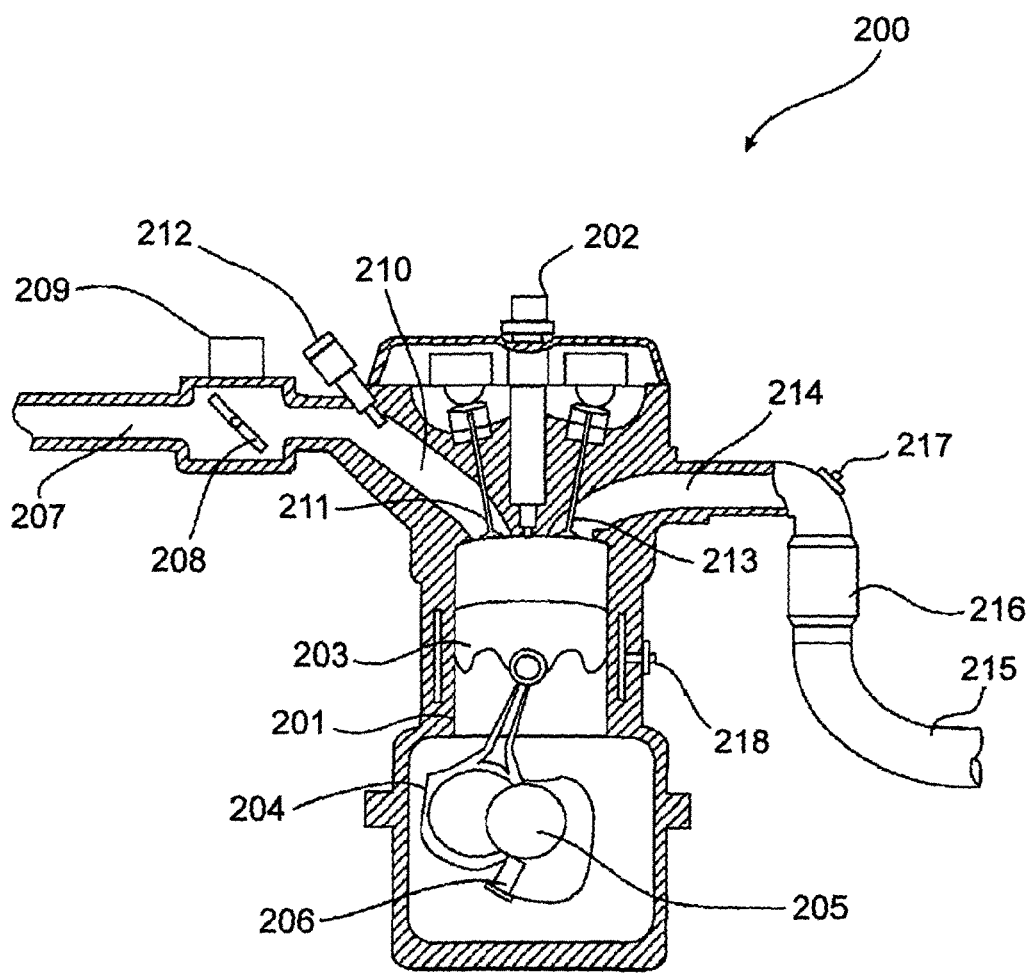
FIG. 1 is a schematic view illustrating the configuration of an engine according to an embodiment of the invention.

First, the configuration of an engine that is controlled by a control device for an internal combustion engine according to the embodiment of the invention will be described with reference to FIG. 1. FIG. 1 is a schematic view illustrating the configuration of the engine according to the embodiment.

In FIG. 1, an engine 200 is a gasoline engine, which is an example of an "internal combustion engine", and the engine 200 is configured to serve as a main power source for a vehicle (e.g. a hybrid vehicle). The "internal combustion engine" is a term that collectively signifies engines each of which includes a plurality of cylinders and is configured such that the power, which is generated when an air-fuel mixture containing fuel such as gasoline, light oil, or alcohol, is burned in a combustion chamber in each cylinder, is taken out as driving force via physical or mechanical transmitting members such as a piston, a connecting rod and a crankshaft.

The engine 200 according to the present embodiment includes a plurality of cylinders 201 arranged in-line in a direction perpendicular to the sheet on which FIG. 1 is drawn, and the cylinders 201 have the same structure. Therefore, only one of the cylinders 201 will be described below.

The engine 200 is configured such that an air-fuel mixture is burned in the cylinder 201 in response to an ignition operation performed by an ignition device 202 including an ignition plug (reference numeral is omitted) part of which protrudes into a combustion chamber, and a reciprocating motion of a piston 203, which is produced by an explosive force generated as the air-fuel mixture is burned, into a rotary motion of a crankshaft 205 via a connecting rod 204.

A crank position sensor 206 that detects a rotational position (i.e., a crank angle) of the crankshaft 205 is disposed near the crankshaft 205. The crank position sensor 206 is electrically connected to an electronic control unit (ECU) 100 (not illustrated). The ECU 100 is configured to calculate an engine speed NE of the engine 200 based on a crank angle signal output from the crank position sensor 206.

In the engine 200, the air taken from the outside passes through an intake pipe 207, and is then introduced into the cylinder 201 through an intake manifold 210 when an intake valve 211 is open. The intake manifold 210 is provided with a pressure sensor (not illustrated). A fuel injection valve of an injector 212 protrudes into the intake manifold 210, and is configured to inject fuel into the intake manifold 210. The fuel injected from the injector 212 is mixed with the intake air around the timing at which the intake valve 211 is opened. As a result, the air-fuel mixture is produced.

The fuel is stored in a fuel tank (not illustrated), and is supplied to the injector 212 through a delivery pipe (not illustrated) by the action of a feed pump (not illustrated). The air-fuel mixture burned in the cylinder 201 is turned into exhaust gas, and the exhaust gas is introduced into an exhaust pipe 215 through an exhaust manifold 214 when an exhaust valve 213 is open. The exhaust valve 213 is opened and closed in accordance with an opening-closing motion of the intake valve 211.

A throttle valve 208 is disposed upstream of the intake manifold 210 in the intake pipe 207. The throttle valve 208 is able to adjust the amount of intake air introduced via a cleaner (not illustrated). The throttle valve 208 is configured such that the driving state thereof is controlled by a throttle valve motor 209 that is electrically connected to the ECU 100. The ECU 100 basically controls the throttle valve motor 209 such that a throttle opening degree corresponding to the operation amount of an accelerator pedal (not illustrated) is achieved. However, the ECU 100 may adjust the throttle opening degree by controlling the operation of the throttle valve motor 209 without taking into account the intention of a driver. That is, the throttle valve 208 is configured as a kind of electronically-controlled throttle valve.

The exhaust pipe 215 is provided with a three-way catalyst 216. The three-way catalyst 216 is a catalytic converter configured to reduce nitrogen oxide (NOx) in the exhaust gas discharged from the engine 200 and to oxidize carbon monoxide (CO) and hydrocarbon (HC) in the exhaust gas. The catalytic converter is not limited to such a three-way catalyst, and a catalyst such as a NOx storage reduction (NSR) catalyst or an oxidation catalyst may be provided instead of or in addition to the three-way catalyst.

The exhaust pipe 215 is provided with an air-fuel ratio sensor 217 configured to detect an air-fuel ratio of the exhaust gas from the engine 200. In addition, in a water jacket formed in a cylinder block that accommodates the cylinders 201, there is provided a water temperature sensor 218 that detects a coolant temperature of a coolant (LLC) that is circulated to cool the engine 200. The air-fuel ratio sensor 217 and the water temperature sensor 218 are electrically connected to the ECU 100, and each of the detected air-fuel ratio and coolant temperature is acquired by the ECU 100 at regular or irregular intervals.

Figure 2:
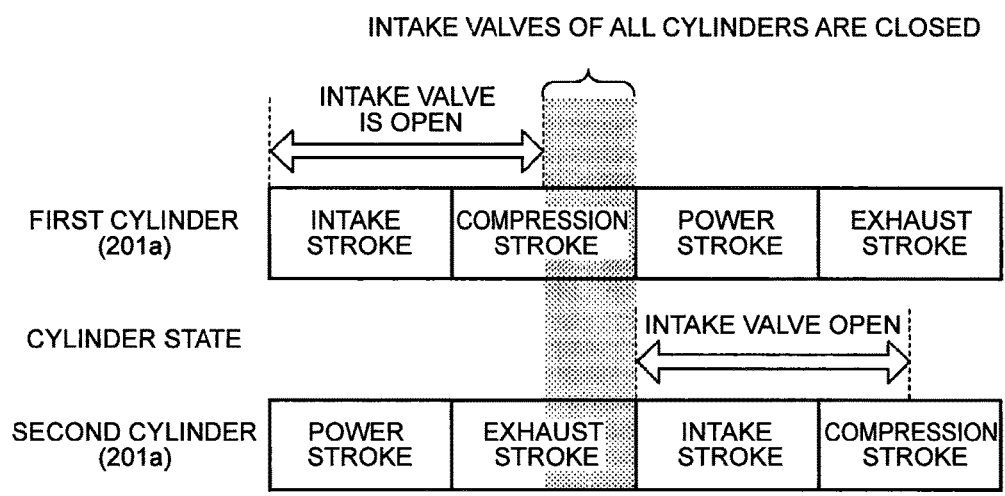
FIG. 2 is a stroke chart illustrating the state of strokes in each of cylinders in the engine according to the embodiment.

Next, each of the strokes during the operation of the engine 200 according to the present embodiment will be described with reference to FIG. 2. FIG. 2 is a stroke chart illustrating the state of strokes in each of cylinders in the engine 200 according to the present embodiment As illustrated in FIG. 2, the engine 200 according to the present embodiment includes a first cylinder 201a and a second cylinder 201b. In each of the first cylinder 201a and the second cylinder 201b, the four strokes, that is, the intake stroke, the compression stroke, the power stroke, and the exhaust stroke repeatedly take place. In addition, the first cylinder 201a and the second cylinder 201b are controlled such that the strokes are changed at timings set in advance.

The manner in which the strokes are changed in the first cylinder 201a and the second cylinder 201b will be described in detail below. When the first cylinder 201a is on the intake stroke, the second cylinder 201b is on the power stroke. When the first cylinder 201a is on the compression stroke, the second cylinder 201b is on the exhaust stroke. When the first cylinder 201a is on the power stroke, the second cylinder 201b is on the intake stroke. When the first cylinder 201a is on the exhaust stroke, the second cylinder 201b is on the compression stroke.

The intake valve 211 of each of the first cylinder 201a and the second cylinder 201b is open during a period from the beginning of the intake stroke to the end of the first half of the compression stroke. Thus, in the engine 200 according to the present embodiment, a period during which the intake valve 211 of the first cylinder 201a is open and a period during which the intake valve 211 of the second cylinder 201b is open do not coincide with each other. As long as such a condition is satisfied, the engine 200 according to the present embodiment may include three or more cylinders 201.

As indicated by a shaded area in FIG. 2, in the engine 200, the intake valves 211 of all the cylinders 201 are closed during a period during which the first cylinder 201a is on the second half of the compression stroke and the second cylinder 201b is on the second half of the exhaust stroke. In this state, if the throttle valve 208 is closed (or the opening degree of the throttle valve 208 is considerably small), the air returned to the intake manifold 210 from the cylinder 201 is not allowed to flow out of the intake manifold 210. As a result, the pressure in the intake manifold 210 increases.

When the pressure in the intake manifold 210 increases to a positive pressure, the compression torque may be increased. This is because, when the intake valve 211 of the cylinder 201 that undergoes the intake stroke next is opened, the air in an amount larger than that of the air that should flow in the cylinder 201 flows in the cylinder 201. The compression torque may cause vibrations (e.g. vibrations of a body of the engine 200 and vibrations of a drive system). Therefore, the compression torque should be minimized.

The control device for an internal combustion engine according to the present embodiment is configured to reduce the occurrence of vibrations due to such an increase in the pressure in the intake manifold 210. Specifically, under the situation that there is a possibility that the pressure in the intake manifold 210 will increase, the throttle valve 208 is controlled such that the opening degree of the throttle valve 208 becomes larger than the opening degree thereof corresponding to an idling operation (hereinafter, referred to as "ISC opening degree"). Thus, it is possible to prevent an increase in the pressure in the intake manifold 210. As a result, it is possible to reduce the occurrence of vibrations.

Figure 3:
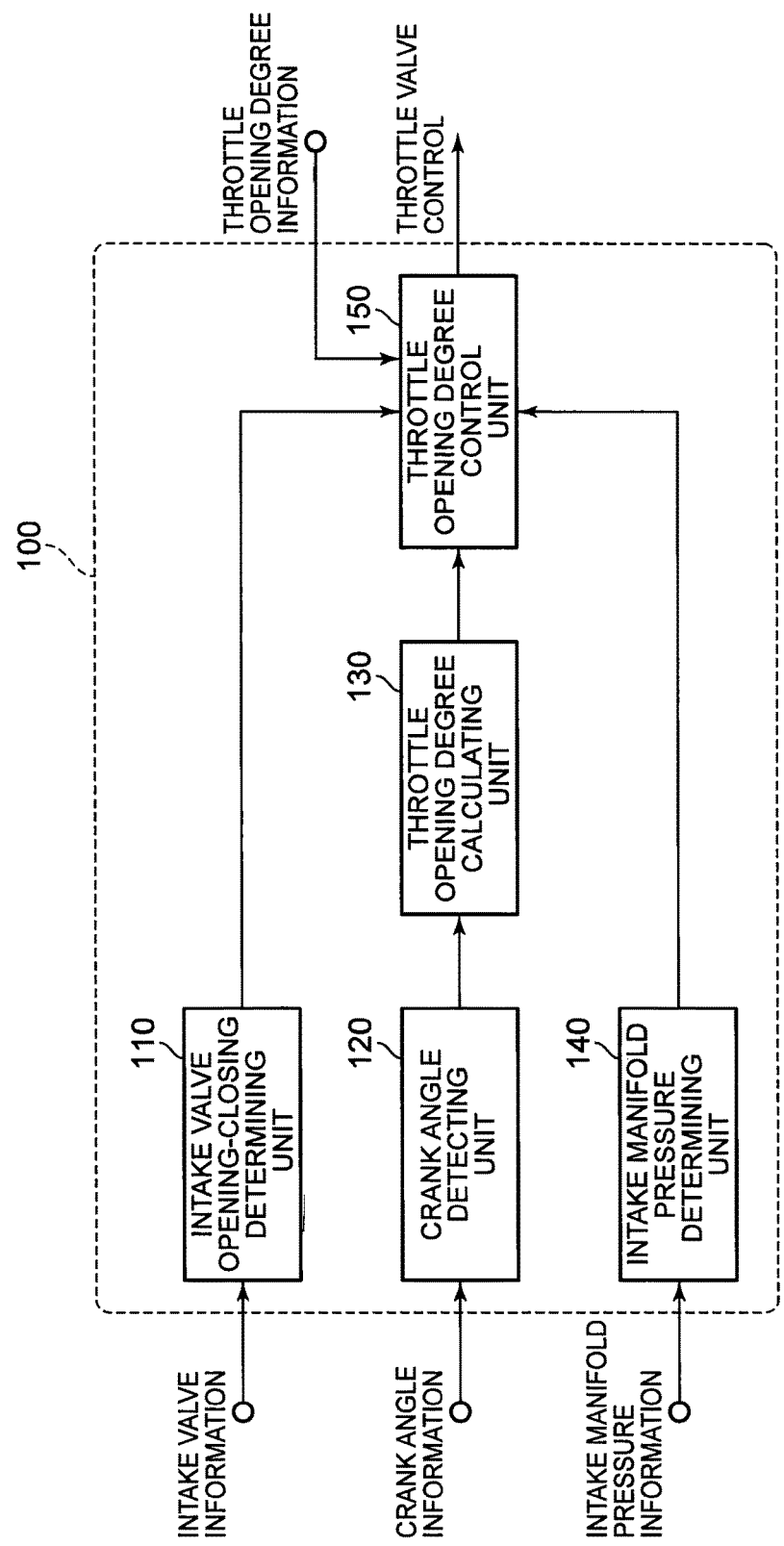
FIG. 3 is a block diagram illustrating the configuration of an electronic control unit (ECU) according to the embodiment.

Next, the concrete configuration of the ECU 100 that constitutes a main portion of the control device for an internal combustion engine according to the present embodiment will be described with reference to FIG. 3. FIG. 3 is a block diagram illustrating the configuration of the ECU 100 according to the present embodiment. FIG. 3 illustrates only the elements closely related to the present embodiment, out of the elements of the ECU 100, and illustration of other elements is omitted.

The ECU 100 in FIG. 3 is an example of a "control device for an internal combustion engine". The ECU 100 is an electronic control unit including, for example, a central processing unit (CPU), a read only memory (ROM), and a random access memory (RAM), and is configured to control the operation of each component of a hybrid vehicle 1. The ECU 100 is configured to execute control of the engine 200, and various controls of the entirety of the vehicle according to control programs stored in, for example, the ROM.

The ECU 100 includes an intake valve opening-closing determining unit 110, a crank angle detecting unit 120, a throttle opening degree calculating unit 130, an intake manifold pressure determining unit 140, and a throttle opening degree control unit 150.

The intake valve opening-closing determining unit 110 is an example of "open-close determining means", and determines whether to execute the later-described control of the throttle valve 208, based on the open-closed state of the intake valves 211 of the cylinders 201. The result of determination made by the intake valve opening-closing determining unit 110 is output to the throttle opening degree control unit 150.

The crank angle detecting unit 120 detects a crank angle of the engine 200. The value of the crank angle detected by the crank angle detecting unit 120 is output to the throttle opening degree calculating unit 130. The value of the crank angle detected by the crank angle detecting unit 120 may be output to the intake valve opening-closing determining unit 110 and used to determine the open-closed state of the intake valve 211.

The throttle opening degree calculating unit 130 is an example of "opening degree adjusting means", and calculates a target opening degree (an example of a "first opening degree"), which is used when the throttle valve 208 is controlled, based on the value of the crank angle detected by the crank angle detecting unit 120. The target opening degree calculated by the throttle opening degree calculating unit 130 is output to the throttle opening degree control unit 150. The concrete method of calculating the target opening degree using the throttle opening degree calculating unit 130 will be described later in detail.

The intake manifold pressure determining unit 140 determines whether to execute the later-described control of the throttle valve 208, based on the pressure in the intake manifold 210. The result of determination made by the intake manifold pressure determining unit 140 is output to the throttle opening degree control unit 150.

The throttle opening degree control unit 150 is an example of "opening degree control means", and controls the opening degree of the throttle valve 208. The throttle opening degree control unit 150 is configured to control the opening degree of the throttle valve 208 based on the results of determinations made by the intake valve opening-closing determining unit 110 and the intake manifold pressure determining unit 140 such that the throttle opening degree of the throttle valve 208 coincides with the target opening degree calculated by the throttle opening degree calculating unit 130.

The ECU 100 including the units described above is a single electronic control unit, and all the operations of the above-described units are executed by the ECU 100. However, the physical, mechanical, and electrical configurations of the above-described units according to the invention are not limited to those described above. For example, the above-described units may be configured as various computer systems such as a plurality of ECUs, various processing units, various controllers, or microcomputer devices.

Figure 4:
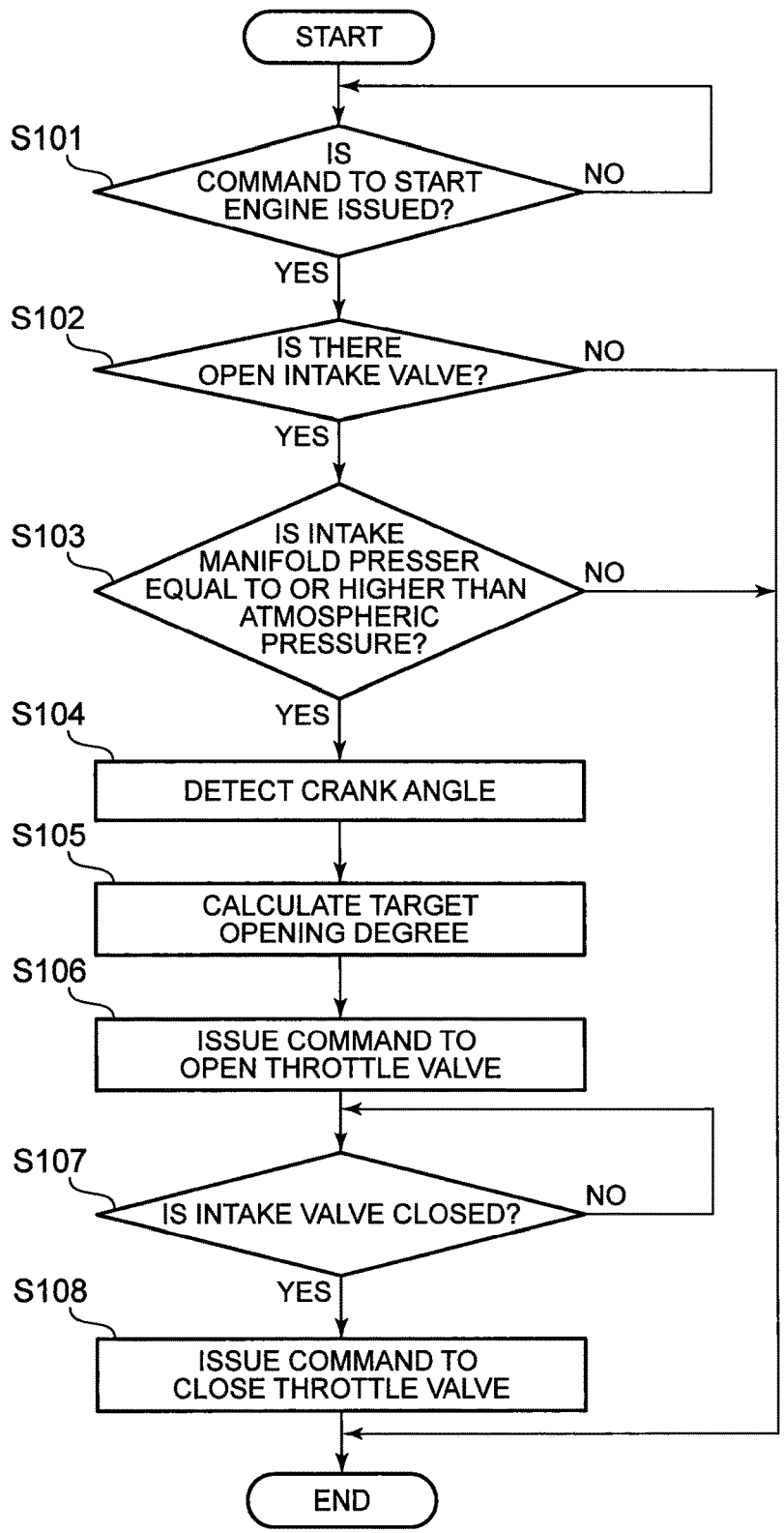
FIG. 4 is a flowchart illustrating the operation of a control device for an internal combustion engine according to the embodiment.

Next, the operation of the control device for an internal combustion engine according to the present embodiment will be described with reference to FIG. 4. FIG. 4 is a flowchart illustrating the operation of the control device for an internal combustion engine according to the embodiment.

As illustrated in FIG. 4, the control device for an internal combustion engine according to the present embodiment controls the starting operation of the engine 200 that has been at a standstill. Specifically, when a command to start the engine 200 that has been at a standstill is issued (YES in step S101), the intake valve opening-closing determining unit 110 determines whether or not the intake valve 211 of any one of the cylinders 201 is open (step S102). When the intake valve opening-closing determining unit 110 determines that none of the intake valves 211 of the cylinders 201 is open (that is, when the intake valves 211 of all the cylinders 201 are closed) (NO in step S102), the following steps are omitted. That is, an increase in the pressure in the intake manifold 210 due to flowback of the air from the cylinder 201 does not occur, so that it is determined that control of the throttle valve 208 is not necessary.

On the other hand, when the intake valve opening-closing determining unit 110 determines that the intake valve 211 of any one of the cylinders 201 is open (YES in step S102), the intake manifold pressure determining unit 140 determines whether or not the pressure in the intake manifold 210 is equal to or higher than the atmospheric pressure (step S103). When the intake manifold pressure determining unit 140 determines that the pressure in the intake manifold 210 is lower than the atmospheric pressure (NO in step S103), the following steps are omitted. Thus, it is possible to avoid inconvenience caused by controlling the opening degree of the throttle valve 208.

Specifically, in the case where the pressure in the intake manifold 210 is lower than the atmospheric pressure, when the opening degree of the throttle valve 208 is made larger than the ISC opening degree, the pressure in the intake manifold 210 increases. As a result, the compression torque also increases. Therefore, when the pressure in the intake manifold 210 is lower than the atmospheric pressure, the occurrence of vibrations is reduced by not executing the control of the throttle valve 208.

On the other hand, when the intake manifold pressure determining unit 140 determines that the pressure in the intake manifold 210 is equal to or higher than the atmospheric pressure (YES in step S103), the crank angle detecting unit 120 detects a value of the crank angle of the engine 200 (step S104), and the throttle opening degree calculating unit 130 calculates a target opening degree of the throttle valve 208 (step S105).

Figure 5:
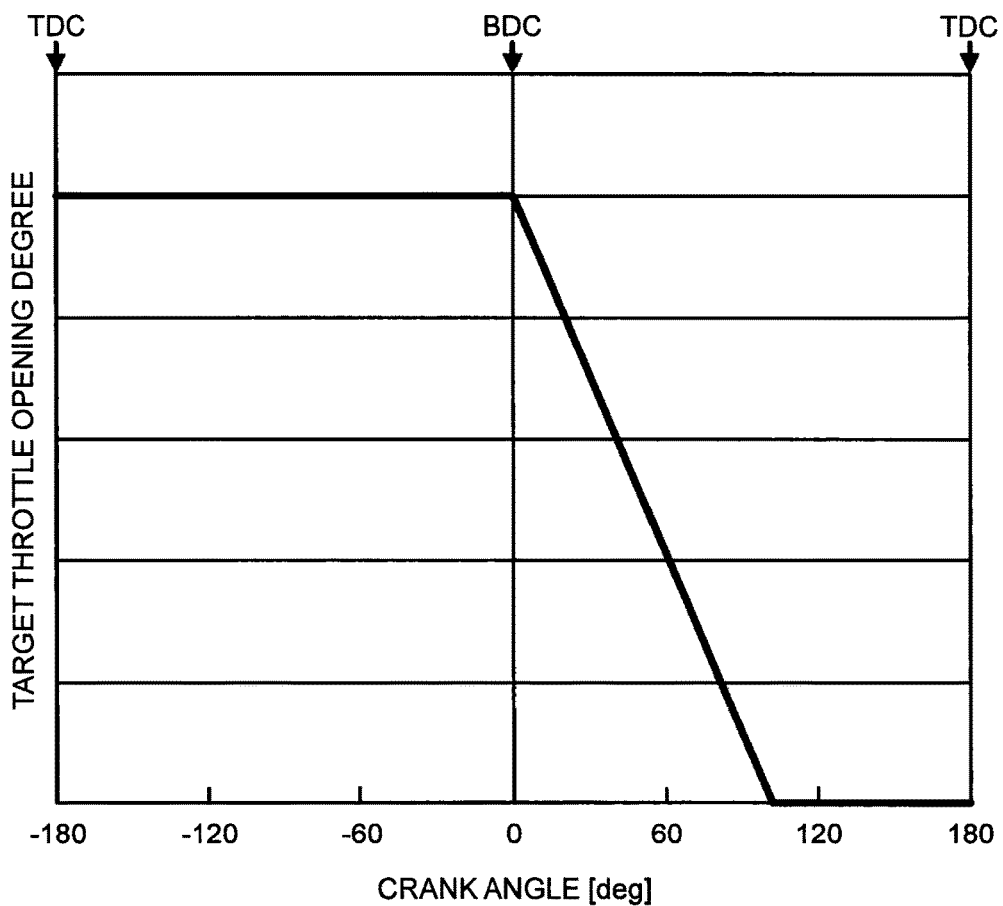
FIG. 5 is a map used to calculate a target opening degree of a throttle valve.

Hereinafter, the method of calculating the target opening degree of the throttle valve 208 will be described in detail with reference to FIG. 5. FIG. 5 is a map used to calculate the target opening degree of the throttle valve 208.

As illustrated in FIG. 5, the throttle opening degree calculating unit 130 sets the target opening degree to a smaller value as the value of the crank angle at the time of startup of the engine 200 is closer to the crank angle at the top dead center (TDC) in a direction from the bottom dead center (BDC) to the TDC. Specifically, when the crank angle is within a range from −180 degrees to zero degrees in a direction from the TDC to the BDC, the target opening degree is set to a relatively large constant value. On the other hand, when the crank angle is within a range from zero degrees to 180 degrees in a direction from the BDC to the TDC, the target opening degree is set to a smaller value as the value of the crank angle at the time of startup of the engine 200 is closer to the crank angle corresponding to the TDC. After the crank angle exceeds a value about 100 degrees, the target opening degree is set to zero (i.e., the value at which control is not executed).

If the target opening degree is not calculated based on the crank angle and the target opening degree is always set to a relatively large constant value, there is a possibility that the opening degree of the throttle valve 208 will not become the ISC opening degree by the time when the piston passes the next TDC even if the throttle valve 208 is controlled such that the opening degree of the throttle valve 208 is brought to the ISC opening degree after the intake valve 211 is closed. That is, after the opening degree of the throttle valve 208 is adjusted to the target opening degree, even if the throttle valve 208 is controlled such that the opening degree of the throttle valve 208 is returned to the opening degree before the control, there is a possibility that the opening degree of the throttle valve 208 will fail to completely return to the opening degree before the control due to a time lug between the issuance of a command and the actual completion of the operation. In such a case, the amount of air taken into the cylinder 201 that undergoes the intake stroke next increases. This increases the compression torque, resulting in stronger vibrations.

In contrast to this, in the present embodiment, the target opening degree is set to a smaller value as the value of the crank angle at the time of startup of the engine 200 is closer to the crank angle at the top dead center (TDC). Thus, as the crank angle is closer to the crank angle at the TDC, the amount by which the throttle valve 208 is controlled is smaller. As a result, it is possible to avoid the situation where the vibrations due to the compression torque are increased due to execution of the control on the opening degree of the throttle valve 208.

The map illustrated in FIG. 5 is just an example. As long as a map, which is prepared on the condition that an increase in the pressure in the intake manifold 210 is reduced and the opening degree of the throttle valve 208 is appropriately adjusted to the ISC opening degree, is used, the effects described above are achieved. Note that, it is not always necessary to use a map to calculate a target opening degree, and a target opening degree may be calculated in another method.

Referring again to FIG. 4, after the target opening degree is calculated, the throttle opening degree control unit 150 controls the opening degree of the throttle valve 208 such that the opening degree of the throttle valve 208 becomes the target opening degree (step S106). Thus, it is possible to avoid an increase in the pressure in the intake manifold 210. As a result, the occurrence of vibrations is reduced.

When it is determined that the intake valve 211 of the cylinder 201, which has been determined to be open, is closed (YES in step S107), the throttle opening degree control unit 150 controls the throttle valve 208 such that the throttle valve 208 is closed. Specifically, the opening degree of the throttle valve 208 is controlled so as to return to the ISC opening degree before the control of the opening degree is executed (step S108). Thus, it is possible to rapidly generate a negative pressure in the intake manifold 210 after the intake valve 211 is closed.

Figure 6:
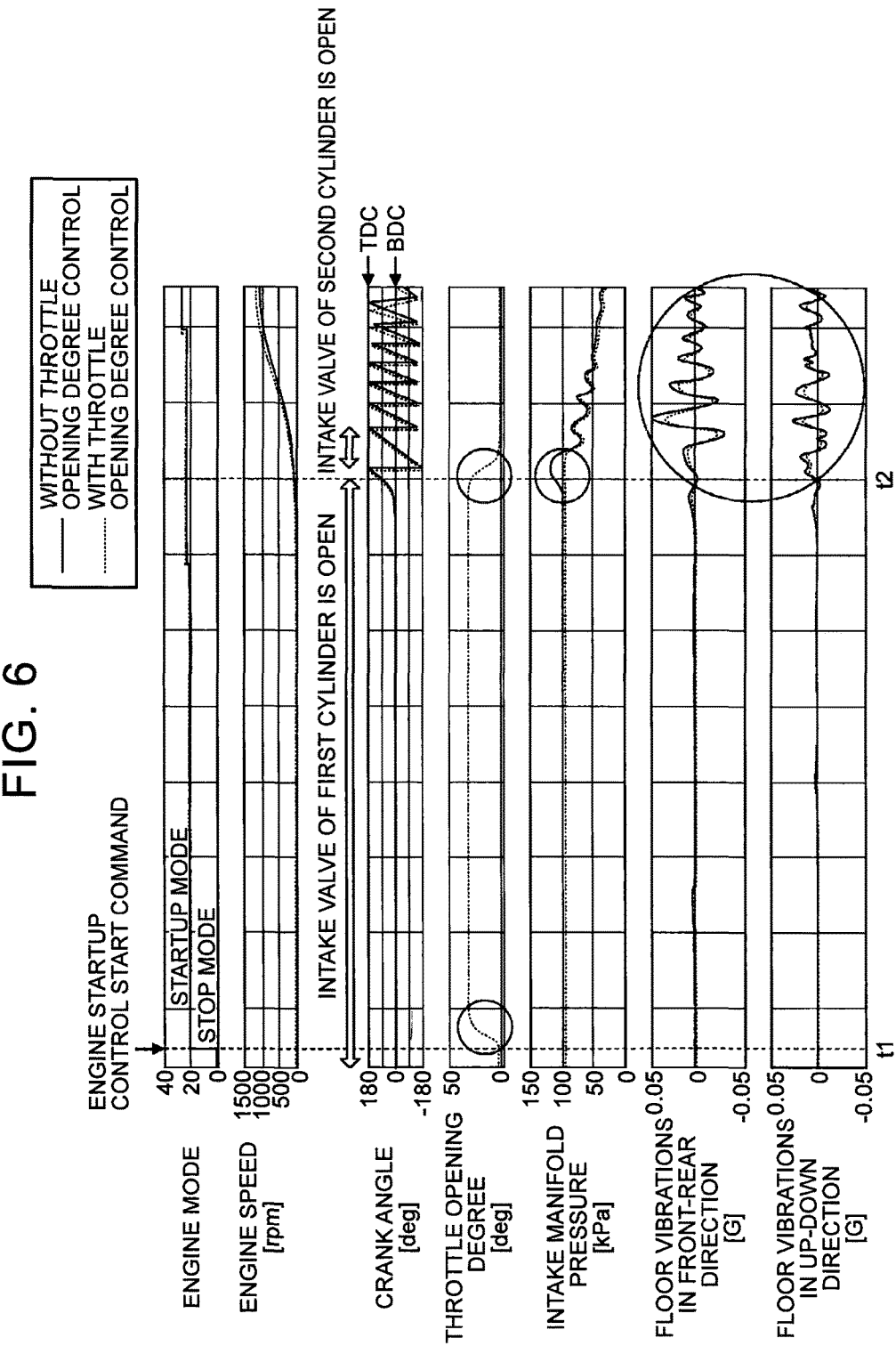
FIG. 6 is a timing chart illustrating an action of each element caused by the control executed by the control device for an internal combustion engine according to the embodiment.

Next, a concrete example of the control executed by the control device for an internal combustion engine according to the present embodiment will be described with reference to FIG. 6. FIG. 6 is a timing chart illustrating an action of each element caused by the control executed by the control device for an internal combustion engine according to the present embodiment. In FIG. 6, each of the parameters when control according to a comparative example is executed (i.e., when control of the throttle valve 208 according to the present embodiment is not executed) is indicated by a solid line, whereas each of the parameters when the control according to the present embodiment is executed is indicated by a broken line.

In the example illustrated in FIG. 6, a startup command is issued to the engine 200, which has been at a standstill, at time t1 to change the engine mode from the stop mode to the startup mode. At time t1, the intake valve 211 of the first cylinder 201*a* is open.

When the startup command is issued to the engine 200, the processes from step S102 to step S106 illustrated in FIG. 4 are executed such that the opening degree of the throttle valve 208 is controlled to be the target opening degree. Thus, in the control according to the present embodiment, the throttle opening degree is increased immediately after time t1. On the other hand, in the control according to the comparative example, there is no change in the throttle opening degree even after time t1.

The intake valve 211 of the first cylinder 201*a* is then closed at time t2. Thus, in the control according to the present embodiment, the throttle opening degree is returned to the ISC opening degree immediately after time t2 (i.e., the throttle opening degree is controlled so as to be smaller than the target opening degree).

In the control according to the comparative example, the pressure in the intake manifold 210 increases immediately after time t2 at which the intake valve 211 of the first cylinder 201*a* is closed. This is because the air returned to the intake manifold 210 from the cylinder 201 is not allowed to flow out of the intake manifold 210 due to the closure of the throttle valve 208. On the other hand, in the control according to the present embodiment, the opening degree of the throttle valve 208 is controlled so as to become larger, so that the pressure in the intake manifold 210 does not increase even immediately after time t2 at which the intake valve 211 of the first cylinder 201*a* is closed.

As a result, in the control according to the comparative example, relatively large vibrations occur after time t2. On the other hand, in the control according to the present embodiment, vibrations are reduced as compared with the control according to the comparative example.

Figure 7:
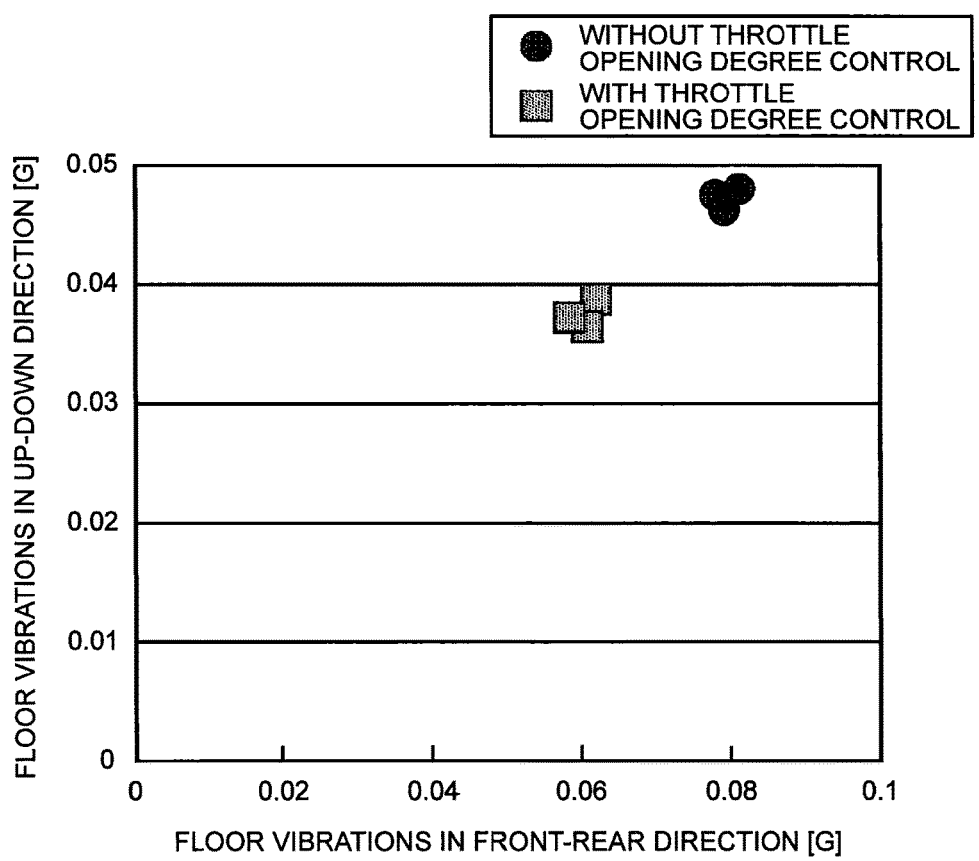
FIG. 7 is a map for comparing the degree of occurrence of vibrations between the embodiment of the invention and a comparative example.

Because it is somewhat difficult to understand vibrations with reference to FIG. 6, vibrations at the time of the control according to the comparative example and vibrations at the time of the control according to the present embodiment will be compared with reference to FIG. 7. FIG. 7 is a map for comparing the degree of occurrence of vibrations between the present embodiment and the comparative example.

FIG. 7 shows that there is a clear difference between the control according to the comparative example and the control according to the present embodiment in each of both the floor vibrations in the front-rear direction and the floor vibrations in the up-down direction. That is, with the control according to the present embodiment, both the floor vibrations in the front-rear direction and the floor vibrations in the up-down direction are reduced as compared with those at the time of the control according to the comparative example. According to a study conducted by the inventor of the present application, it is revealed that if the control according to the present embodiment is executed, the floor vibrations in the front-rear direction and the floor vibrations in the up-down direction are reduced by approximately 20%.

As described above, with the control device for an internal combustion engine according to the present embodiment, it is possible to effectively reduce the occurrence of vibrations due to the compression torque, by controlling the opening degree of the throttle valve 208 at the time of startup of the engine 200.

The invention is not limited to the embodiment described above, and the embodiment of the invention described above may be modified as appropriate within the scope of the invention defined by claims and the entirety of the specification. A control device for an internal combustion engine according to the modified embodiment is within the technical scope of the invention.

What is claimed is:

1. A control device for an internal combustion engine, the internal combustion engine including a plurality of cylinders, and the internal combustion engine being configured such that when an intake valve of one cylinder on a compression stroke among the plurality of cylinders is open, an intake valve of each of the remainder of the plurality of cylinders is closed, the control device comprising
an electronic control unit configured to:
  (i) determine an open-closed state of the intake valve of each of the plurality of cylinders;
  (ii) adjust an opening degree of a throttle valve to a first opening degree that is larger than a second opening degree corresponding to an idling operation, when the electronic control unit determines that the intake valve of any one of the plurality of cylinders is open on the compression stroke at time of startup of the internal combustion engine; and
  (iii) adjust the opening degree of the throttle valve from the first opening degree to the second opening degree, when the electronic control unit determines that the intake valve of the cylinder, the intake valve having been determined to be open, is closed on the compression stroke.

2. The control device according to claim 1, wherein the electronic control unit is configured to set the first opening degree to a smaller value as a crank angle of the cylinder of which the electronic control unit determines that the intake valve is open, at the time of startup of the internal combustion engine is closer to a crank angle at a top dead center in a direction from a bottom dead center to the top dead center.

3. The control device according to claim 1, wherein the electronic control unit is configured to adjust the opening degree of the throttle valve to the first opening degree, when a pressure in an intake manifold at the time of startup of the internal combustion engine is equal to or higher than an atmospheric pressure.

* * * * *